(12) United States Patent
Chang et al.

(10) Patent No.: US 11,067,813 B2
(45) Date of Patent: Jul. 20, 2021

(54) HEAD-MOUNTED DISPLAY DEVICE

(71) Applicant: HTC Corporation, Taoyuan (TW)

(72) Inventors: Li-Hsun Chang, Taoyuan (TW);
Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/118,443

(22) Filed: Aug. 31, 2018

(65) Prior Publication Data
US 2019/0137765 A1 May 9, 2019

Related U.S. Application Data

(60) Provisional application No. 62/581,039, filed on Nov. 3, 2017.

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC ............. G02B 27/0176; G02B 27/017; G02B 2027/0178; G02B 27/01; G02B 2027/0181; G02B 23/125; G02B 27/0149; G06F 1/163; G06F 3/011; G06F 3/012; G06F 3/013; G06F 1/1635; G06F 1/1656
See application file for complete search history.

(56) References Cited

U.S. PATENT DOCUMENTS 3,955,885 A * 5/1976 Aronsohn ................ G02C 3/00
351/155
5,666,182 A * 9/1997 Donner .................. G02C 3/003
351/155

(Continued)

FOREIGN PATENT DOCUMENTS

CN 101937132 1/2011
CN 205720875 11/2016

(Continued)

OTHER PUBLICATIONS

"Office Action of Taiwan Counterpart Application", dated Jun. 5, 2019, p. 1-p. 4.

(Continued)

*Primary Examiner* — Jose R Soto Lopez
(74) *Attorney, Agent, or Firm* — JCIPRNET (57) ABSTRACT

A head-mounted display device including a body, a strap, two first elastic parts, two second elastic parts, two first soft pads and two second soft pads is provided. The body is corresponded to an eye of the user. The strap is connected to the body and adapted to surround a head of a user. The two first elastic parts and the two second elastic parts are disposed on the strap or the body. The two first soft pads are disposed on these first elastic parts. These first soft pads are respectively configured to lean against the left cheek bone of the user and the right cheek bone of the user. The two second soft pads are disposed on these second elastic parts. These second soft pads are respectively configured to lean against the section between the left first soft pad and the left ear of the user and the section between the right first soft pad and the right ear of the user.

9 Claims, 9 Drawing Sheets

(56) References Cited

U.S. PATENT DOCUMENTS

| | | | | |
|---|---|---|---|---|
| 5,786,932 | A * | 7/1998 | Pniel | G02B 27/0176 250/214 VT |
| 5,954,642 | A * | 9/1999 | Johnson | G06F 3/011 600/300 |
| 6,986,169 | B2 * | 1/2006 | Nakamura | A42B 3/00 2/410 |
| 7,120,939 | B1 * | 10/2006 | Howard | A61F 9/029 2/416 |
| 7,956,822 | B2 * | 6/2011 | Nakabayashi | G02B 27/01 345/8 |
| 8,959,667 | B2 | 2/2015 | Nakabayashi et al. | |
| 10,133,305 | B1 * | 11/2018 | Sullivan | G06F 1/1637 |
| 10,212,517 | B1 * | 2/2019 | Beltran | H04S 3/004 |
| 10,251,292 | B2 * | 4/2019 | Araki | G02B 27/0176 |
| 10,317,682 | B2 * | 6/2019 | Drinkwater | G02B 27/0179 |
| 10,477,711 | B2 * | 11/2019 | Araki | G02B 27/0176 |
| 2001/0034895 | A1 * | 11/2001 | Ikeda | A42B 3/127 2/414 |
| 2001/0047693 | A1 * | 12/2001 | Saito | G02B 27/0176 74/159 |
| 2003/0115661 | A1 * | 6/2003 | Dobbie | G02B 27/0176 2/422 |
| 2003/0115662 | A1 * | 6/2003 | Dobbie | G02B 27/0176 2/422 |
| 2004/0156113 | A1 * | 8/2004 | Buchanan, Jr. | G02B 23/125 359/630 |
| 2004/0181858 | A1 * | 9/2004 | Soto | G02B 7/002 2/448 |
| 2006/0061544 | A1 * | 3/2006 | Min | G06F 3/012 345/156 |
| 2006/0143766 | A1 * | 7/2006 | Ramsey | A61F 9/02 2/15 |
| 2008/0141437 | A1 * | 6/2008 | Braunecker | A61F 7/032 2/206 |
| 2008/0238815 | A1 * | 10/2008 | Ishino | G02B 27/017 345/8 |
| 2008/0291277 | A1 * | 11/2008 | Jacobsen | G02B 27/0172 348/158 |
| 2009/0059501 | A1 * | 3/2009 | Yamaguchi | A61F 9/029 361/679.27 |
| 2009/0066607 | A1 * | 3/2009 | Yasuda | H04N 13/344 345/8 |
| 2009/0128450 | A1 * | 5/2009 | Nakabayashi | G02B 27/0176 345/8 |
| 2010/0327028 | A1 * | 12/2010 | Nakabayashi | G02B 27/0176 224/162 |
| 2011/0088147 | A1 * | 4/2011 | Aral | A42B 3/127 2/414 |
| 2012/0017357 | A1 * | 1/2012 | Aral | A42B 3/127 2/411 |
| 2012/0174294 | A1 * | 7/2012 | Sackett | A42B 3/328 2/414 |
| 2013/0182414 | A1 * | 7/2013 | Fedewa | A42B 3/0446 362/106 |
| 2013/0318776 | A1 * | 12/2013 | Jacobs | G06F 3/013 29/592.1 |
| 2013/0321925 | A1 * | 12/2013 | Jacobs | G02B 27/0176 359/630 |
| 2013/0322683 | A1 * | 12/2013 | Jacobs | G02C 13/003 382/103 |
| 2013/0340148 | A1 * | 12/2013 | Arai | A42B 3/08 2/421 |
| 2014/0168784 | A1 * | 6/2014 | Hiraki | G02B 27/0176 359/630 |
| 2014/0196197 | A1 * | 7/2014 | Lin | G11B 33/06 2/410 |
| 2014/0338105 | A1 * | 11/2014 | Maier | A42B 3/08 2/421 |
| 2015/0026858 | A1 * | 1/2015 | Ross | A42B 3/20 2/2.5 |
| 2015/0113713 | A1 * | 4/2015 | Aral | A42B 3/221 2/424 |
| 2015/0126845 | A1 * | 5/2015 | Jin | G06F 3/013 600/383 |
| 2015/0234189 | A1 * | 8/2015 | Lyons | G02B 27/0093 345/174 |
| 2016/0037853 | A1 * | 2/2016 | Ikeda | A42B 3/127 2/410 |
| 2016/0116759 | A1 * | 4/2016 | Janisse | A61F 9/029 2/451 |
| 2016/0338429 | A1 * | 11/2016 | Mendez | G02C 11/12 |
| 2017/0090514 | A1 * | 3/2017 | Byun | G02B 27/0176 |
| 2017/0248990 | A1 * | 8/2017 | Chen | G02B 27/0176 |
| 2017/0259167 | A1 * | 9/2017 | Cook | A63F 13/28 |
| 2017/0337737 | A1 * | 11/2017 | Edwards | F16M 13/04 |
| 2018/0024369 | A1 * | 1/2018 | Kato | G02B 27/0176 359/13 |
| 2018/0095498 | A1 * | 4/2018 | Raffle | G02B 7/026 |
| 2018/0099143 | A1 * | 4/2018 | Kim | A61N 5/0616 |
| 2018/0185733 | A1 * | 7/2018 | King | A63B 71/10 |
| 2018/0284468 | A1 * | 10/2018 | Parker | G02B 30/37 |
| 2019/0014840 | A1 * | 1/2019 | Fung | A41G 7/00 |
| 2019/0030394 | A1 * | 1/2019 | Orr | A63B 21/4005 |
| 2019/0056601 | A1 * | 2/2019 | Lee | G02C 5/143 |
| 2019/0159354 | A1 * | 5/2019 | Zheng | A42B 1/24 |
| 2019/0223536 | A1 * | 7/2019 | Erb | A42B 3/127 |
| 2020/0029050 | A1 * | 1/2020 | Antunes | G06F 3/03547 |
| 2020/0133387 | A9 * | 4/2020 | Lee | G06F 3/017 |

FOREIGN PATENT DOCUMENTS

| | | |
|---|---|---|
| CN | 106444035 | 2/2017 |
| CN | 206074914 | 4/2017 |
| CN | 206321884 | 7/2017 |
| CN | 206421104 | 8/2017 |
| CN | 206573784 | 10/2017 |
| TW | I534476 | 5/2016 |

OTHER PUBLICATIONS

"Organic Cotton _ Bamboo VR Cover for Gear VR and Oculus Rift. Plus Leather VR Cover _ VR Cover", retrieved from https://vrcover.com/organic-cotton-bamboo-vr-cover-for-gear-vr-and-oculus-rift-plus-leather-vr-cover/.

"Office Action of China Counterpart Application", dated Oct. 26, 2020, p. 1-p. 7.

* cited by examiner

HEAD-MOUNTED DISPLAY DEVICE

CROSS-REFERENCE TO RELATED APPLICATION

This application claims the priority benefit of U.S. provisional application Ser. No. 62/581,039, filed on Nov. 3, 2017. The entirety of the above-mentioned patent application is hereby incorporated by reference herein and made a part of this specification.

BACKGROUND

Technical Field

The disclosure relates to a head-mounted display device. More particularly, the disclosure relates to a head-mounted display device suited to most of the head shapes.

Description of Related Art

The virtual reality (VR) system is a popular technology in the market, and after wearing a head mounted display device (HMD) through a strap or other accessories for securing, a user may enjoy three-dimensional images through the body in front of the eyes and thereby obtains a realistic and true-to-life experience. In order to allow a head-mounted display device to be reliably worn tightly on the head of the user and be firmly attached to the face of the user, a one-piece frame is used together with soft pads to enable the head-mounted display device of the related art to be attached to the face.

Figure 1:
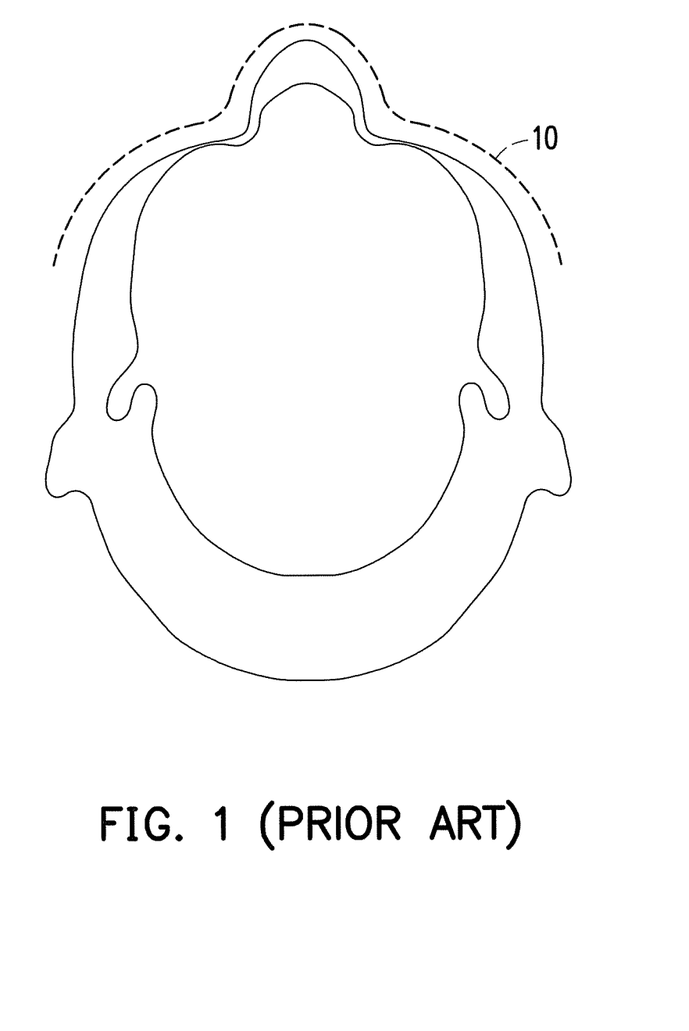
FIG. 1 is a schematic cross-sectional view of a head-mounted display device of the conventional art being worn by different users.

Nevertheless, curves are found between the nose and cheek bones and between the cheek bones and the ears, and shapes of the curves and bending degree of the curves vary from person to person, for example, facial contours of some people may be shaped as a circle while facial contours of some other people are shaped more like a square. FIG. 1 is a schematic cross-sectional view of a head-mounted display device of the conventional art being worn by different users, and the following description refers to FIG. 1. FIG. 1 illustrates two closed contours which individually represent different facial contours of two users, and the contact surface where a head-mounted display device 10 of the prior art is in contact with the facial contour of the user is represented by the dotted line. Since deformation of a one-piece frame is limited, so that supporting directions of the soft pads are limited as well, that is, deformation of the above contact surface is not great, and thereby, the head-mounted display device may be suited to facial contours of some users only. For instance, the contact surface where the head-mounted display device 10 in FIG. 1 is in contact with the facial contour of the user may be matched with faces of users with larger facial contours. Nevertheless, when the head-mounted display device 10 of the related art is worn by a user with a smaller facial contour, the shape of the facial contour of the user is not matched with the foregoing contact surface, so the head-mounted display device 10 of the related art can not be tightly attached to the face of the user with a smaller facial contour, and the user thus may not enjoy a comfortable using experience.

SUMMARY

The disclosure provides a head-mounted display device capable of allowing a shape to be automatically adjusted to be matched with facial contours of different users.

A head-mounted display device provided by an embodiment of the disclosure includes a body, a strap, two first elastic parts, two second elastic parts, two first soft pads, and two second soft pads. The body is corresponded to eyes of the user. The strap is connected to the body and adapted to surround a head of a user. The two first elastic parts and the two second elastic parts are disposed on the strap or the body. The two first soft pads are disposed on these first elastic parts. These first soft pads are respectively configured to lean against the left cheek bone of the user and the right cheek bone of the user. The two second soft pads are disposed on these second elastic parts. These second soft pads are respectively configured to lean against the section between the left first soft pad and the left ear of the user and the section between the right first soft pad and the right ear of the user.

To sum up, since the first soft pads and the second soft pads individually lean against different positions of the user's face, the head-mounted display device provided by the disclosure is appropriately attached to the user's face, so that the user may enjoy a comfortable using experience.

To make the aforementioned more comprehensible, several embodiments accompanied with drawings are described in detail as follows.

DESCRIPTION OF THE EMBODIMENTS

Figure 2:
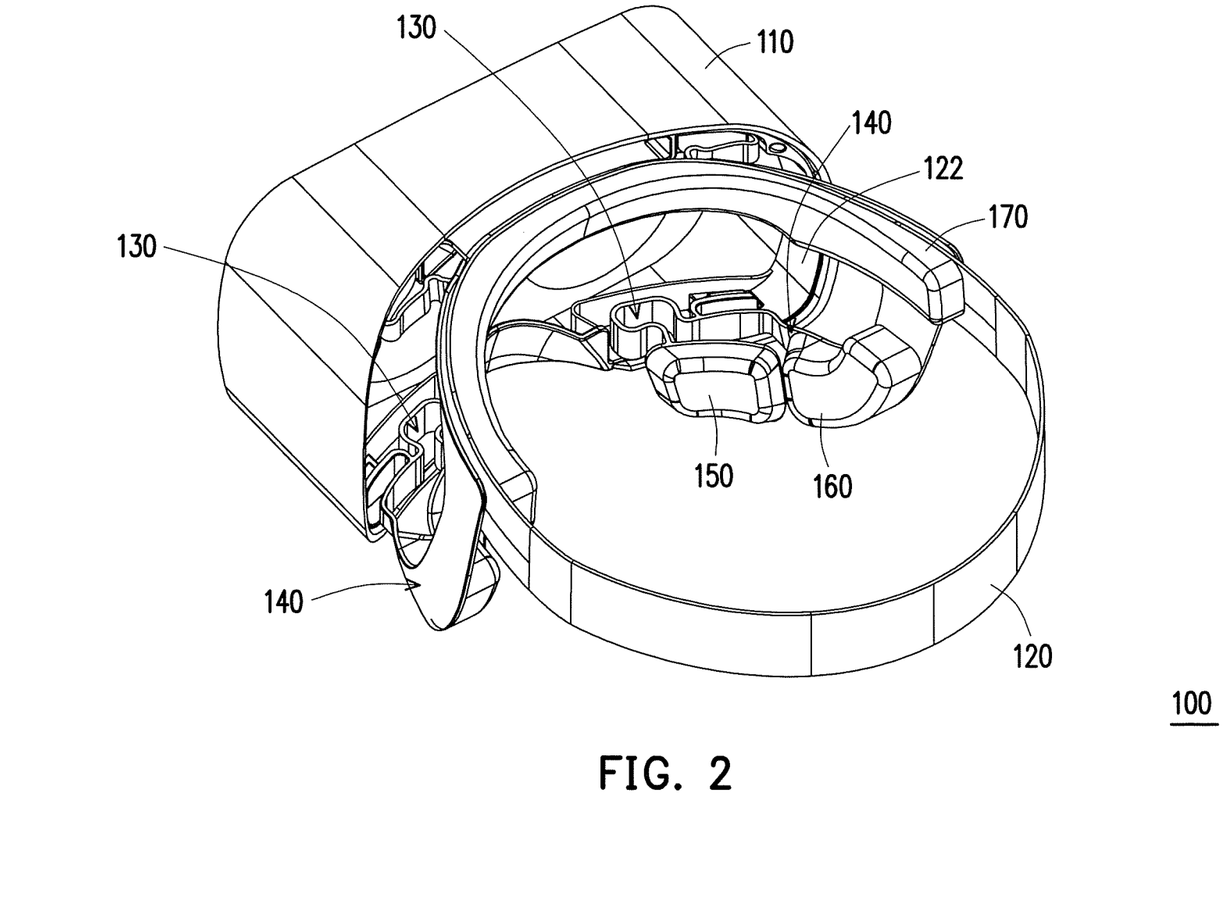
FIG. 2 is a schematic view of a head-mounted display device according to an embodiment of the invention.
Figure 3:
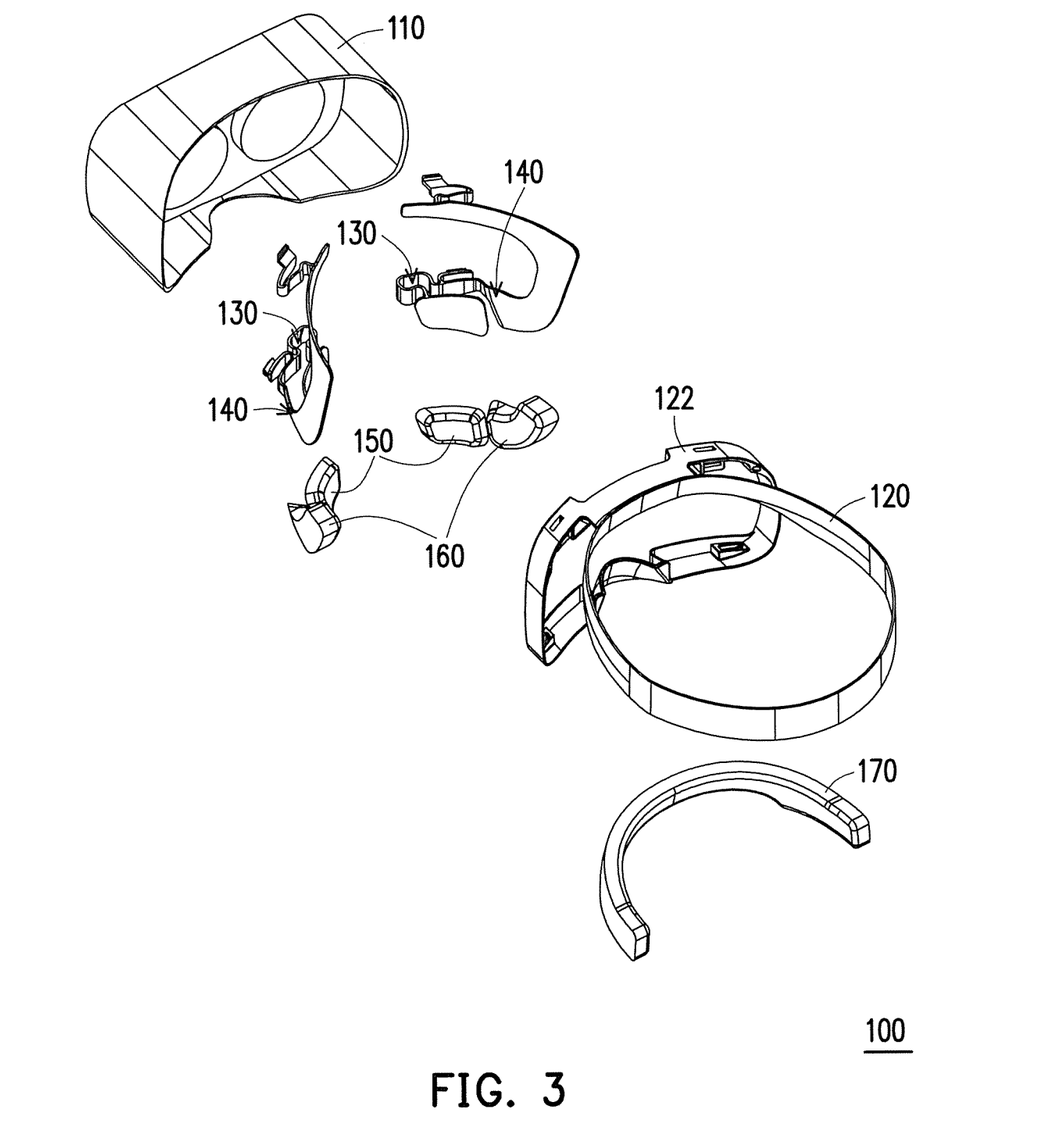
FIG. 3 is a schematic exploded view of the head-mounted display device of FIG. 2.
Figure 4:
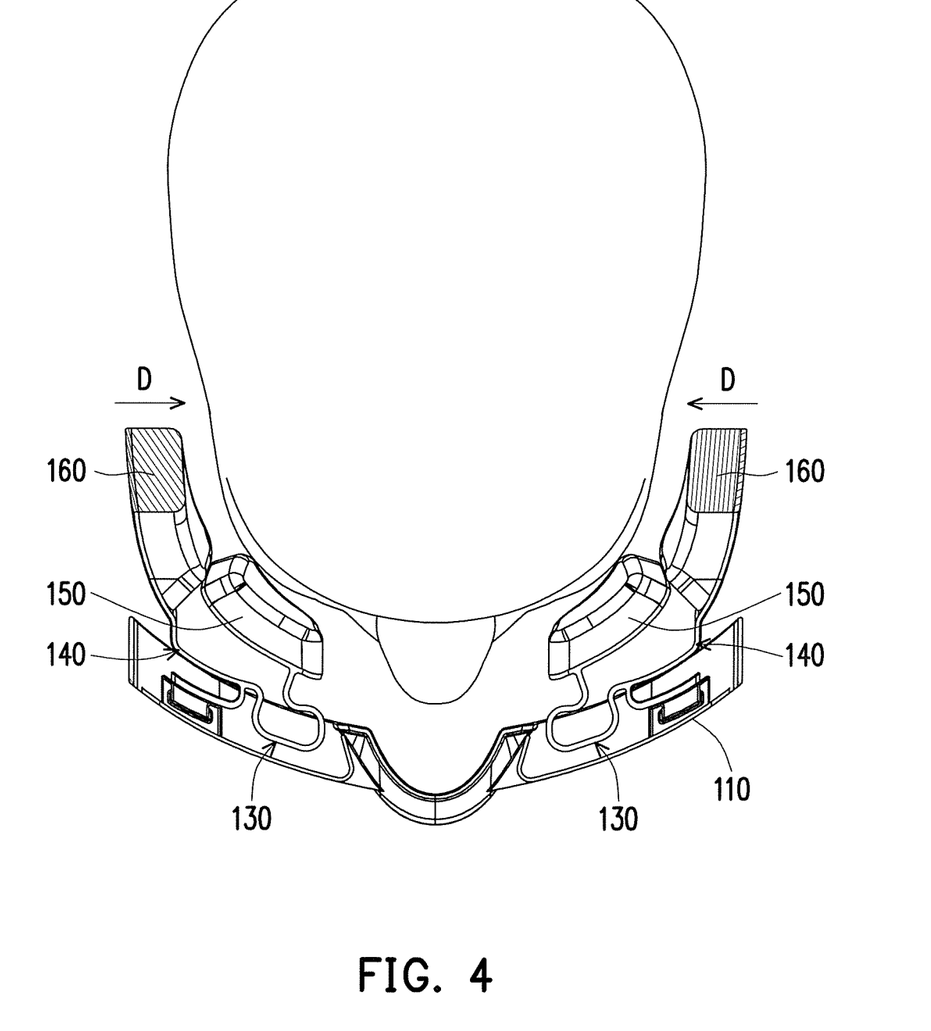
FIG. 4 is a cross-sectional view of the head-mounted display device of FIG. 2 when being worn on a head of a user.

FIG. 2 is a schematic view of a head-mounted display device according to an embodiment of the invention. FIG. 3 is a schematic exploded view of the head-mounted display device of FIG. 2. FIG. 4 is a cross-sectional view of the head-mounted display device of FIG. 2 when being worn on a head of a user. With reference to FIG. 2 to FIG. 4, a head-mounted display device 100 of this embodiment includes a body 110, a strap 120, two first elastic parts 130, two second elastic parts 140, two first soft pads 150, and two second soft pads 160. The strap 120 is connected to the body 110 and is adapted to surround the head of the user. The two first elastic parts 130 and the two second elastic parts 140 of this embodiment are disposed on the strap 120, but the two first elastic parts 130 and the two second elastic parts 140 may also be disposed on the body 110 in other embodiments. Each of the first soft pads 150 is disposed on one first elastic part 130. One of the first soft pads 150 is adapted to lean against a left cheek bone of the user, and the other one of the first soft pads 150 is adapted to lean against a right cheek bone of the user. Each of the second soft pads 160 is disposed on one second elastic part 140. One of the second soft pads 160 is adapted to lean against a section between the left first soft pad 150 and a left ear of the user, and the other one of the second soft pads 160 is adapted to lean against a section between the right first soft pad 150 and a right ear of the user.

As shown in FIG. 4, the body 110 is corresponded to eyes of the user, and the display device disposed at the body 110 is, for example, a liquid-crystal display (LCD) or an organic light-emitting diode (OLED) display. In addition, the body may further include a motion sensor, other electronic components, optical components, etc. The motion sensor may be an accelerometer and a gyroscope, so as to facilitate detection of accelerations and angular accelerations of an X axis, a Y axis, and a Z axis of the head-mounted display device 100.

In this embodiment, through tightening or loosening the strap 120, the head-mounted display device 100 may be further secured to the user's head or may be loosened. To be specific, two ends of the strap 120 are connected to the body 110, and the strap 120 extends from the body 110 along an edge of the head of the user and passes above the ears of the user to surround the head of the user. Herein, the strap 120 may be tightened or loosened through an adjustment mechanism (not shown), and a manner used to adjust tightening or loosening of the strap is not limited. In addition, the strap 120 is elastic, so when being tightened, the strap 120 may be tightly attached to the head of the user and thereby provides a comfortable using experience for the user.

The two first elastic parts 130 and the two second elastic parts 140 are disposed on the strap 120. The strap 120 may include a support 122. The two first elastic parts 130 and the two second elastic parts 140 are disposed at the support 122, and the support 122 is disposed at the body 110. The two first elastic parts 130 and the two second elastic parts 140 are mutually linked. To be specific, when a force is applied to the two first elastic parts 130, the two second elastic parts 140 are pressed or pulled by the corresponding first elastic parts 130, so as to be moved or deformed.

Each of the first soft pads 150 is disposed on one first elastic part 130. One of the first soft pads 150 is adapted to lean against the left cheek bone of the user, and the other one of the first soft pads 150 is adapted to lean against the right cheek bone of the user. Each of the second soft pads 160 is disposed on one second elastic part 140. One of the second soft pads 160 is adapted to lean against the section between the left first soft pad 150 and the left ear of the user, and the other one of the second soft pads 160 is adapted to lean against the section between the right first soft pad 150 and the right ear of the user. Further, the two first soft pads 150 are configured to provide supports at the front of the face when the user wears the head-mounted display device 100. The two second soft pads 160 are configured to provide supports at the left and the right sides of the face when the user wears the head-mounted display device 100. In addition to providing supports for the user's face, the two first soft pads 150 and the two second soft pads 160 may also be tightly attached to the face of the user, so as to provide a comfortable wearing experience for the user. For instance, a material of the first elastic parts 130 and the second elastic parts 140 may be plastic, rubber, or metal. The first soft pads 150 and the second soft pads 160 may be foam, rubber, foam covering leather cover, foam covering fabric cover, or flocking foam.

The forehead pad 170 is disposed at the strap 120 and is configured to lean against a forehead of the user. To be specific, the forehead pad 170 corresponds to the forehead of the user to act as a supporting portion in front of the head when the user wears the head-mounted display device 100.

In this embodiment, the first elastic part 130 and the second elastic part 140 corresponding to the left side of the user are connected to each other, and the first elastic part 130 and the second elastic part 140 corresponding to the right side of the user are connected to each other. Unlike the one-piece frame used in a head-mounted display device of the related art, in this embodiment, the first soft pad 150 and the second soft pad 160 corresponding to the left side of the user are separated from each other, the first soft pad 150 and the second soft pad 160 corresponding to the right side of the user are also separated from each other, and each of the first elastic parts 130 and the second elastic parts 140 may also be elastically deformed in different directions. The foregoing configuration may allow the head-mounted display device 100 to be more greatly deformed, and a portion where the head-mounted display device 100 is in contact with the head of the user may be automatically deformed according to the head shape of the user.

How to wear the head-mounted display device 100 of this embodiment, and how the head-mounted display device 100 can be attached to the face of the user are described as follows.

First, the body 110 is aligned with positions of the eyes, and the strap 120 is sleeved on the head by the user, so that the head-mounted display device 100 is roughly secured to the head. Afterwards, the strap 120 is tightened by the user, so the two first soft pads 150 individually lean against the left cheek bone and the right cheek bone of the user through the first elastic parts 130, and the forehead pad 170 leans against the forehead of the user. At this time, the two first soft pads 150 approach the body 110 as affected by a reaction force from the face of the user.

The two second soft pads 160 individually move towards the section between the left first soft pad 150 and the left ear of the user and the section between the right first soft pad 150 and the right ear of the user in a direction D through the second elastic parts 140 as shown in FIG. 4, until cheeks of the user are sandwiched between the two second soft pads 150. When the strap 120 is completely tightened, the head-mounted display device 100 is tightly and firmly attached to the head, the front side of the face, and the left cheek and right cheek of the user, that is, the head-mounted display 100 is completely attached along a contour of the face. After the foregoing tightening process is completed, even if the user wears the head-mounted display device 100 for strenuous exercises, the head-mounted display device 100 may not be detached from the head of the user or may not collided with nor rub against the head the user, so that a secure and comfortable wearing experience is provided.

After the strap 120 is tightened, the two first soft pads 150 are attached to the left cheek bone and the right cheek bone of the user through the corresponding first elastic parts 130, and the two second soft pads 160 are attached to the section between the left first soft pad 150 and the left ear of the user and the section between the right first soft pad 150 and the right ear of the user through the corresponding second elastic parts 140, so as to fit curves of the facial contour. In other words, when being worn, the head-mounted display device 100 may be matched with facial contours of most of the users as positions and angles of the two first soft pads 150 and the two second soft pads 160 may be correspondingly changed according to differences of the facial contours of the users, so that most of the users may enjoy a comfortable wearing experience.

Other embodiments are described for illustration in the following. It should be noted that the reference numerals and a part of the contents in the previous embodiment are used in the following embodiments, in which identical reference numerals indicate identical or similar components, and repeated description of the same technical contents is omitted. Different feature principles in each of the embodiments may be applied to other embodiments. Please refer to the descriptions of the previous embodiment for the omitted contents, which will not be repeated hereinafter.

Figure 5:
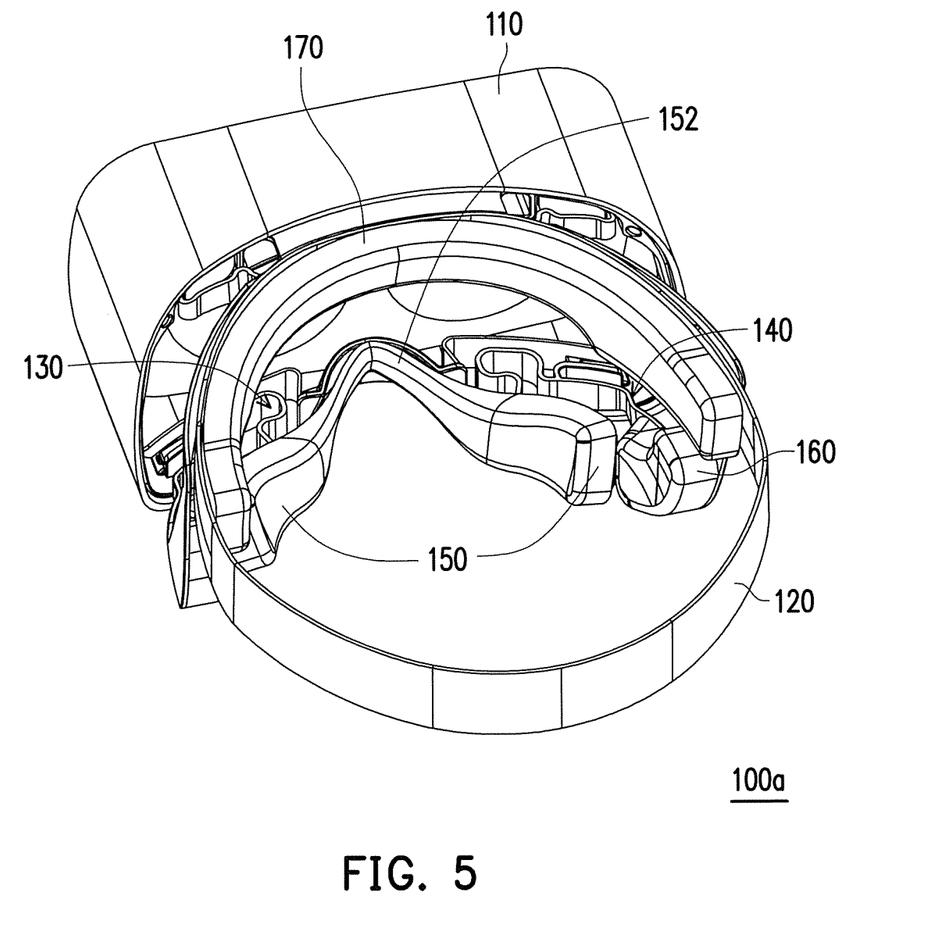
FIG. 5 is a schematic view of a head-mounted display device according to another embodiment of the invention.

FIG. 5 is a schematic view of a head-mounted display device according to another embodiment of the invention. With reference to FIG. 0.5, a head-mounted display device 100a of this embodiment is approximately identical to the head-mounted display device 100 of the foregoing embodiment, and the repeated parts therebetween are not described hereinafter. The difference therebetween is: the two first soft pads.

The head-mounted display device 100a of this embodiment further includes a nose pad 152, which is configured to lean against a nose of the user. The two first soft pads 150 and the nose pad 152 are connected and are integrally formed. In addition to providing additional supports for the face of the user, the nose pad 152 pads may also be attached to the nose of the user, so as to provide a comfortable and secure wearing experience. The two first soft pads 150 and the nose pad 152 of this embodiment are integrally formed, so that costs for mold opening and manufacturing of the individual first soft pads and the nose pad may be saved, and time required for individually aligning the two first soft pads 150 during assembly may also be reduced.

Figure 6:
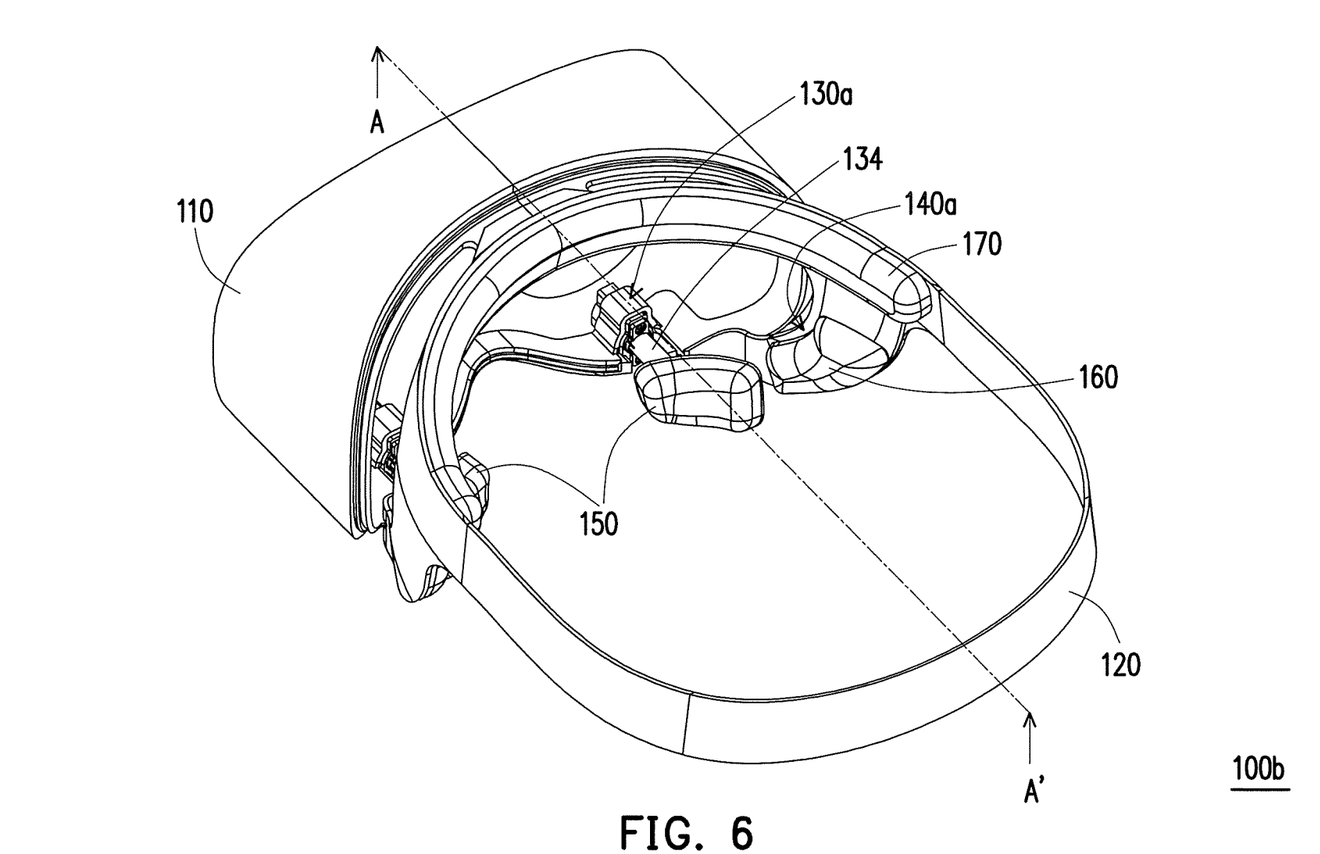
FIG. 6 is a schematic view of a head-mounted display device according to another embodiment of the invention.
Figure 7:
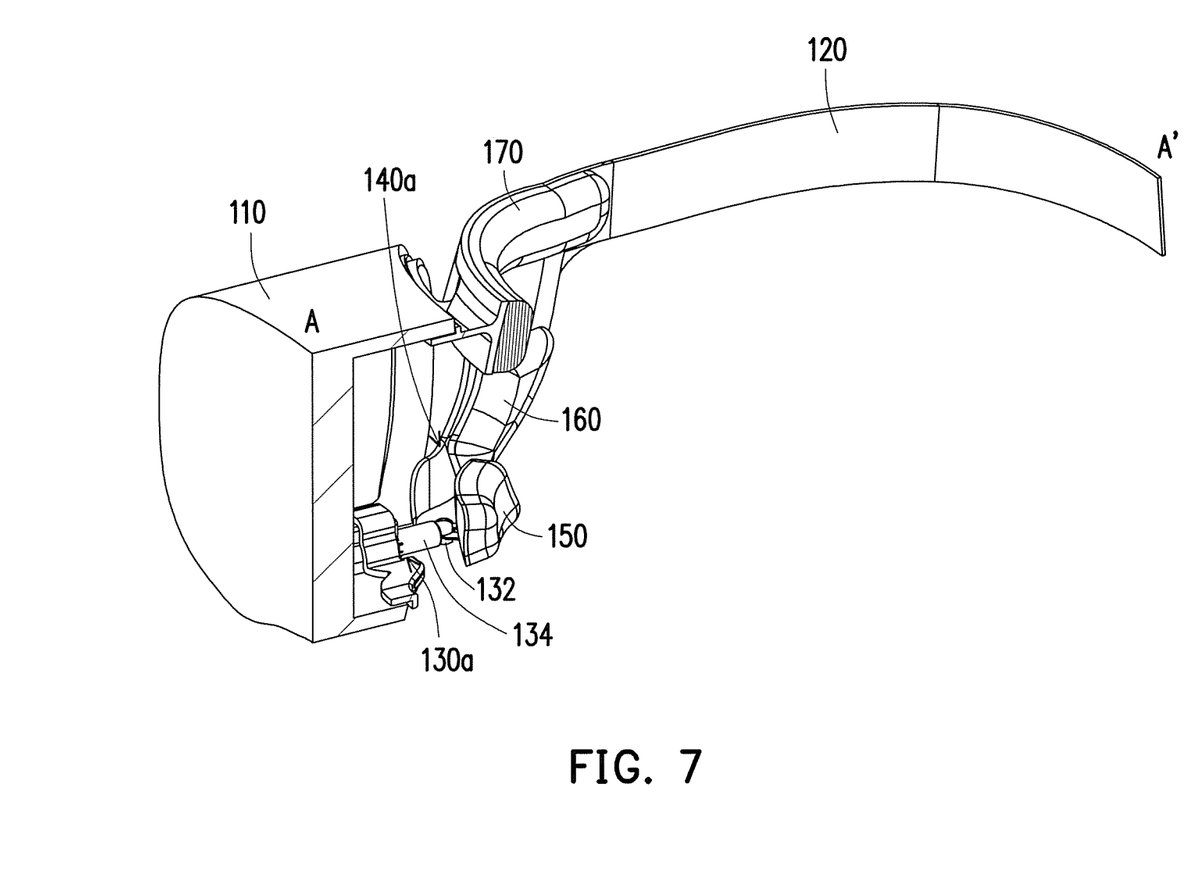
FIG. 7 is a cross-sectional view of the head-mounted display device of FIG. 6 taken along a line A-A'.

FIG. 6 is a schematic view of a head-mounted display device according to another embodiment of the invention. FIG. 7 is a cross-sectional view of the head-mounted display device of FIG. 6 taken along a line A-A'. With reference to FIG. 6 and FIG. 0.7, a head-mounted display device 100b of this embodiment is approximately identical to the head-mounted display device 100 of FIG. 2, and the repeated parts therebetween are not described hereinafter. A difference therebetween is: connection between the two first elastic parts and the two second elastic parts.

In this embodiment, first elastic parts 130a are detachably assembled to the body 110, and second elastic parts 140a and the strap 120 are integrally formed.

From another perspective, the first elastic parts 130a have compression springs 134. In this embodiment, protection shells are disposed around the compression springs 134 covering outer portions of the compression springs 134, so as to prevent the compression springs 134 from being damaged by an external force. The first elastic parts 130a further include ball joints 132 connected to the compression springs 134. Through the above configuration, the corresponding first soft pads 150 may be moved or rotated corresponding to the positions and angles of the left cheek bone and the right cheek bone of the user. In other embodiments, each of the first elastic parts may include a pin joint or connectors of other types, which is not limited by the disclosure in this regard.

The two second elastic parts 140a and the strap 120 of this embodiment are integrally formed, so that costs for mold opening and manufacturing of the individual second elastic parts and the strap are saved. In addition, since the two second elastic parts 140a and the strap 120 of this embodiment are integrally formed, each of the second soft pads 160 may selectively extend along the strap 120 and may be integrally formed with the forehead pad 170, so that costs for mold opening and manufacturing of the individual second soft pads and the forehead pad are saved.

Based on the design principle of two first soft pads and the two second soft pads of this embodiment, the two first soft pads 150 are attached to the left cheek bone and the right cheek bone of the user through the corresponding first elastic parts 130a, and the two second soft pads 160 are attached to the section between the left first soft pad 150 and the left ear of the user and the section between the right first soft pad 150 and the right ear of the user through the corresponding second elastic parts 140a, so as to be matched with the curves of the facial contour. In other words, when being worn, the head-mounted display device 100b may be matched with facial contours of most of the users as positions and angles of the two first soft pads 150 and the two second soft pads 160 may be correspondingly changed according to different facial contours of the users, so that most of the users may enjoy a comfortable wearing experience.

Figure 8:
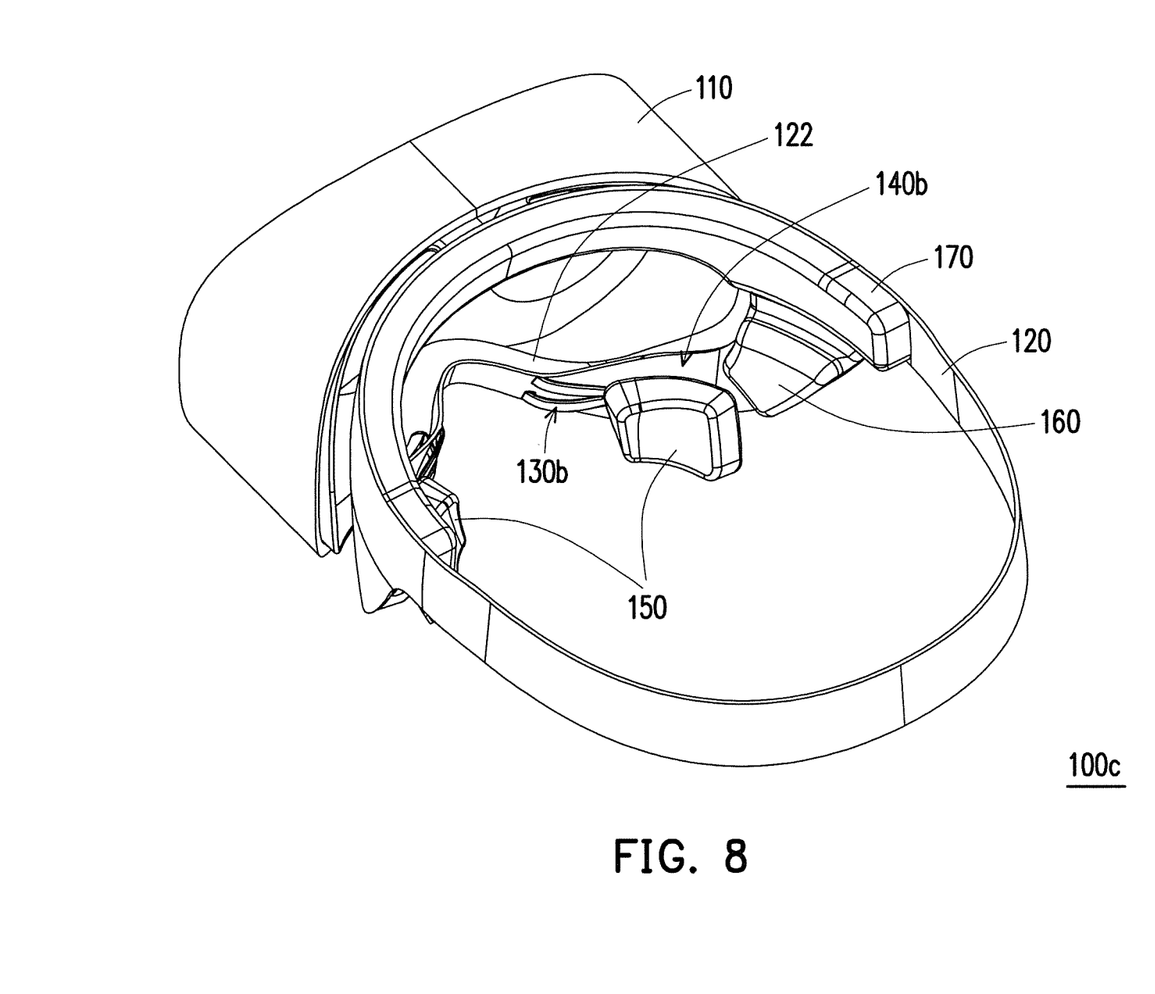
FIG. 8 is a schematic view of a head-mounted display device according to another embodiment of the invention.
Figure 9:
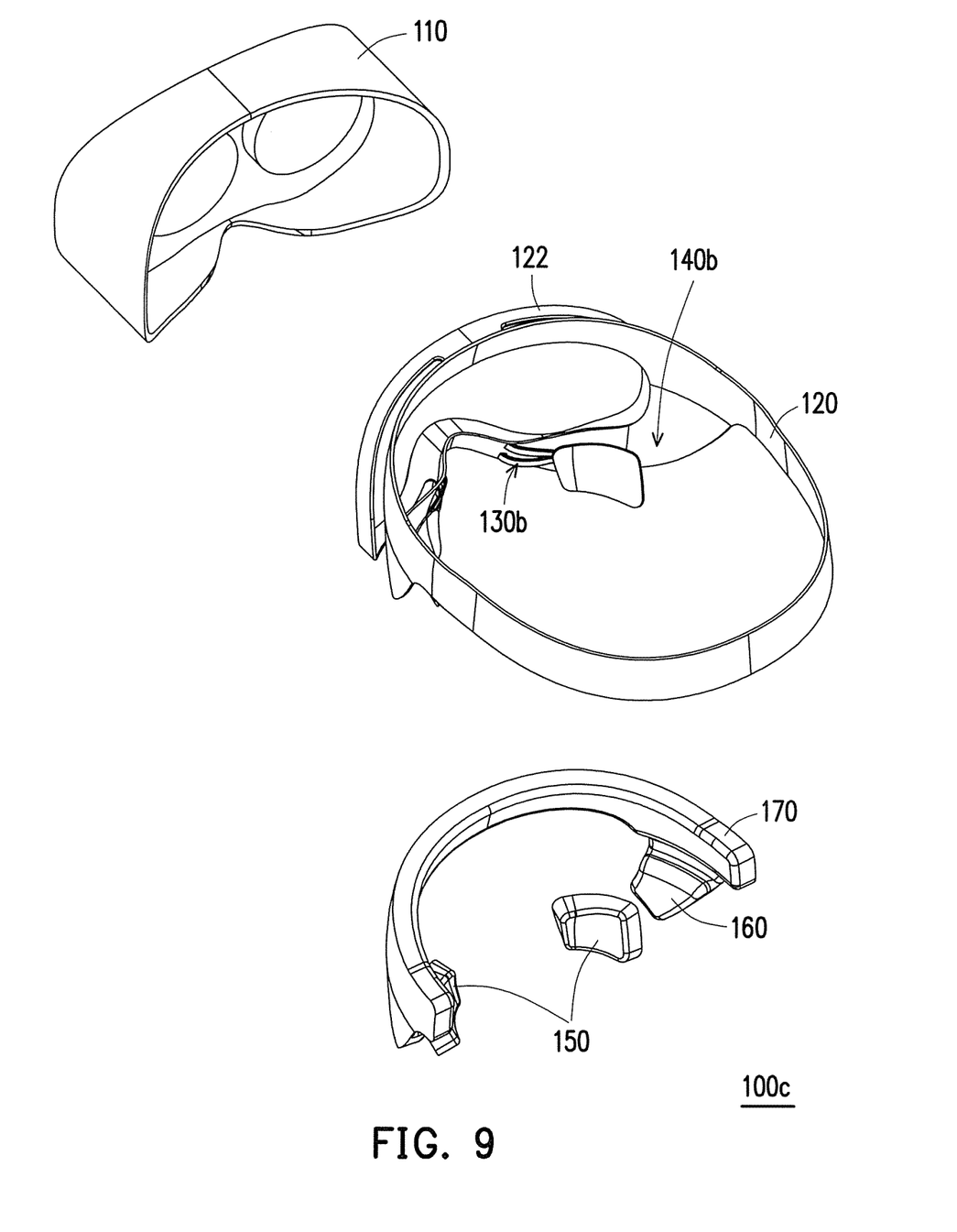
FIG. 9 is a schematic exploded view of the head-mounted display device of FIG. 8.

FIG. 8 is a schematic view of a head-mounted display device according to another embodiment of the invention. FIG. 9 is a schematic exploded view of the head-mounted display device of FIG. 8. With reference to FIG. 8 and FIG. 0.9, a head-mounted display device 100c of this embodiment is approximately identical to the head-mounted display device 100 of FIG. 2, and the repeated parts therebetween are not described hereinafter. A difference therebetween is: connection between the two first elastic parts and the two second elastic parts.

In this embodiment, the first elastic parts 130b, the second elastic parts 140b, and the strap 120 are integrally formed.

The second elastic parts 140b of this embodiment is extend from the strap 120 to be formed. Each of the first elastic parts 130b is an elastic support extending from the corresponding second elastic part 140b to be formed. Through such a structure described above, each of the first soft pads 150 and each of the second soft pads 160 may be disposed at appropriate positions and may be separately moved.

The two first elastic parts 140b, the two second elastic parts 140b, and the strap 120 of this embodiment are integrally formed, so that costs for mold opening and manufacturing of the individual first elastic parts, the second elastic parts, and the strap are saved. In addition, since the two second elastic parts 140b and the strap 120 of this embodiment are integrally formed, each of the second soft pads 160 may extend along the strap 120 and may be integrally formed with the forehead pad 170, so that costs for mold opening and manufacturing of the individual second soft pads and the forehead pad are saved.

Based on the design principle of two first soft pads and the two second soft pads of this embodiment, the two first soft pads 150 are attached to the left cheek bone and the right cheek bone of the user through the corresponding first elastic parts 130b, and the two second soft pads 160 are attached to the section between the left first soft pad 150 and the left ear of the user and the section between the right first soft pad 150 and the right ear of the user through the corresponding second elastic parts 140a, so as to be matched with the curves of the facial contour. In other words, when being worn, the head-mounted display device 100c may be matched with the facial contours of most of the users as positions and angles of the two first soft pads 150 and the two second soft pads 160 may be correspondingly changed according to different facial contours of the users, so that most of the users may enjoy a comfortable wearing experience.

In view of the foregoing, in the head-mounted display device of the disclosure, since the first soft pads and the second soft pads individually lean against different portions of the user's face, the head-mounted display device is appropriately attached to the user's face when being worn, so that the user may enjoy a comfortable using experience. In addition, since the first soft pads and the second soft pads separately lean against different portions of the user's face, positions of the soft pads may be automatically adjusted according to different facial contours of the users, so that most of the users may enjoy a comfortable using experience when wearing the head-mounted display device.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A head-mounted display device, comprising:
   a body, corresponded to eyes of a user;
   a strap, connected to the body, adapted to surround a head of the user;
   two first elastic parts and two second elastic parts, disposed on the strap or the body, wherein the two first elastic parts are respectively disposed on a left side of the body and a right side of the body, and the two second elastic parts are respectively disposed on the left side of the body and the right side of the body;
   two first soft pads, disposed on the first elastic parts, wherein the first soft pads are respectively and only configured to lean against a left cheek bone of the user and a right cheek bone of the user; and
   two second soft pads, disposed on the second elastic parts, wherein the second soft pads are respectively configured to be on a bottom left side of the body and a bottom right side of the body, wherein the second soft pads are respectively configured to lean against a section between the left first soft pad and a left ear of the user and a section between the right first soft pad and a right ear of the user, and the first soft pads and the second soft pads are separated from each other.

2. The head-mounted display device as claimed in claim 1, wherein the first elastic part and the second elastic part corresponding to the left side of the body are connected to each other, and the first elastic part and the second elastic part corresponding to the right side of the body are connected to each other.

3. The head-mounted display device as claimed in claim 1, wherein the first elastic parts are detachably assembled to the body, and the second elastic parts and the strap are integrally formed.

4. The head-mounted display device as claimed in claim 3, wherein each of the first elastic pails has a compression spring.

5. The head-mounted display device as claimed in claim 4, wherein each of the first elastic parts further comprises a ball joint connected to the compression spring.

6. The head-mounted display device as claimed in claim 1, wherein the first elastic parts, the second elastic parts, and the strap are integrally formed.

7. The head-mounted display device as claimed in claim 1, further comprising a forehead pad, disposed on the strap, configured to lean against a forehead of the user.

8. The head-mounted display device as claimed in claim 7, wherein the forehead pad is connected to the second soft pads.

9. The head-mounted display device as claimed in claim 1, further comprising a nose pad, configured to lean against a nose of the user, wherein the first soft pads and the nose pad are connected and are integrally formed.

* * * * *